US011893131B2

(12) United States Patent
Ryan

(10) Patent No.: US 11,893,131 B2
(45) Date of Patent: Feb. 6, 2024

(54) CONTEXTUAL DATA LOSS PREVENTION FOR A GROUP-BASED COMMUNICATION SYSTEM

(71) Applicant: Salesforce, Inc., San Francisco, CA (US)

(72) Inventor: Felipe Ryan, Sydney (AU)

(73) Assignee: Salesforce, Inc., San Francisco, CA (US)

(*) Notice: Subject to any disclaimer, the term of this patent is extended or adjusted under 35 U.S.C. 154(b) by 386 days.

(21) Appl. No.: 17/162,429

(22) Filed: Jan. 29, 2021

(65) Prior Publication Data
US 2022/0245275 A1 Aug. 4, 2022

(51) Int. Cl.
*G06F 21/62* (2013.01)
*H04L 9/40* (2022.01)

(52) U.S. Cl.
CPC .......... *G06F 21/6245* (2013.01); *H04L 63/18* (2013.01); *H04L 63/20* (2013.01); *G06F 21/6263* (2013.01); *G06F 2221/2137* (2013.01)

(58) Field of Classification Search
CPC ............. G06F 21/6245; G06F 21/6263; G06F 2221/2137; G06F 21/84; G06F 21/554; H04L 63/18; H04L 63/20; H04L 2463/121; H04L 63/0407
USPC .......................................................... 726/1
See application file for complete search history.

(56) References Cited

U.S. PATENT DOCUMENTS

| | | | |
|---|---|---|---|
| 2018/0287982 A1 | 10/2018 | Draeger et al. | |
| 2021/0336949 A1* | 10/2021 | Kohli | H04L 12/06 |
| 2022/0100885 A1* | 3/2022 | Singh | G06F 21/6227 |

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

(Continued)

*Primary Examiner* — Jeffrey C Pwu
*Assistant Examiner* — Nega Woldemariam
(74) *Attorney, Agent, or Firm* — Lee & Hayes, P.C.

(57) ABSTRACT

A system, method, and computer-readable media for providing contextual data loss prevention (DLP) within a group-based communication system. At least a portion of a DLP policy may be suspended within a DLP engine based on a context for which a user input is to be displayed. Accordingly, the user input may be displayed without interference from the DLP engine.

20 Claims, 10 Drawing Sheets

(56) References Cited

OTHER PUBLICATIONS

Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c> (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

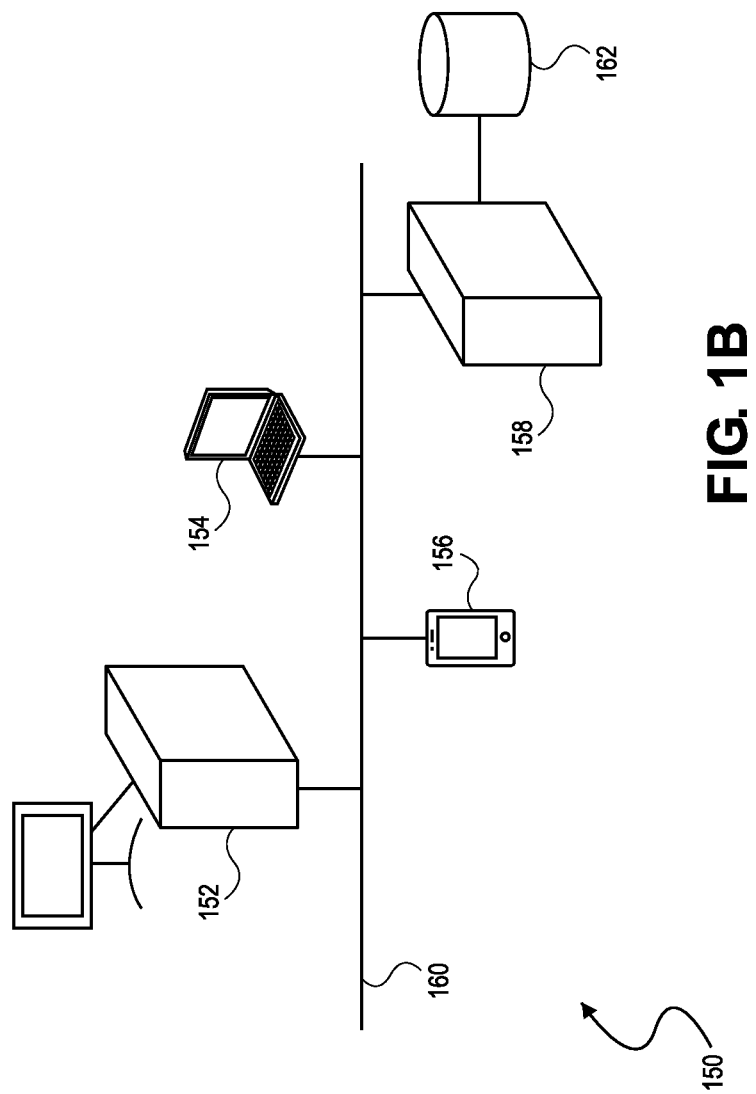

FIG. 6C

CONTEXTUAL DATA LOSS PREVENTION FOR A GROUP-BASED COMMUNICATION SYSTEM

TECHNICAL FIELD

Embodiments of the invention generally relate to data loss prevention techniques. More specifically, embodiments of the invention relate to contextual data loss prevention techniques within a group-based communication system.

Typically, data loss prevention techniques may be used to remove sensitive and or offensive content from a group-based communication system. However, these data loss prevention techniques are not applied contextually such that sensitive content may be intentionally shared in a safe and secure manner. For example, traditional data loss prevention techniques apply a one-size-fits-all approach such that content is removed regardless of the context in which the content is provided.

Accordingly, what is needed is techniques for data loss prevention to be applied contextually within a group-based communication system such that sensitive content can be shared safely and securely.

SUMMARY

Embodiments of the invention solve the above-mentioned problems by providing a system, method, and computer-readable media for providing contextual data loss prevention within a group-based communication system. In some embodiments, at least a portion of a data loss prevention policy may be suspended within a data loss prevention engine based on a context for which a user input is to be displayed.

A first embodiment of the invention is directed to one or more computer-readable media storing computer-executable instructions that, when executed by a processor, perform a method of data loss prevention (DLP) within a group-based communication system, the method comprising receiving a first user input in a first channel of the group-based communication system, applying a DLP policy to the first user input, based on the application of the DLP policy, inhibiting display of the user input in the first channel, in response to applying the DLP policy, creating a second channel within the group-based communication system, receiving a second user input in the second channel of the group-based communication system, in response to applying the DLP policy, displaying the second user input in the second channel.

A second embodiment of the invention is directed to a method of data loss prevention (DLP) within a group-based communication system, the method comprising receiving a first user input in a first channel of the group-based communication system, applying a DLP policy to the first user input, based on the application of the DLP policy, inhibiting display of the user input in the first channel, in response to applying the DLP policy, creating a second channel within the group-based communication system, receiving a second user input in the second channel of the group-based communication system, in response to applying the DLP policy, displaying the second user input in the second channel.

A third embodiment of the invention is directed to a data loss prevention system comprising a data store, and a processor, programmed to perform a method of data loss prevention (DLP) within a group-based communication system, the method comprising receiving a first user input in a first channel of the group-based communication system, applying a DLP policy to the first user input, based on the application of the DLP policy, inhibiting display of the user input in the first channel, in response to applying the DLP policy, creating a second channel within the group-based communication system, receiving a second user input in the second channel of the group-based communication system, in response to applying the DLP policy, displaying the second user input in the second channel.

Additional embodiments of the invention are directed to a method of displaying a vault channel configuration user interface and creating and operating a vault channel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 1B depicts an exemplary diagram illustrating components of a system for carrying out embodiments of the invention;

FIG. 6C depicts an exemplary screenshot illustrating a vault channel user interface for some embodiments of the invention.

Figure 1A:
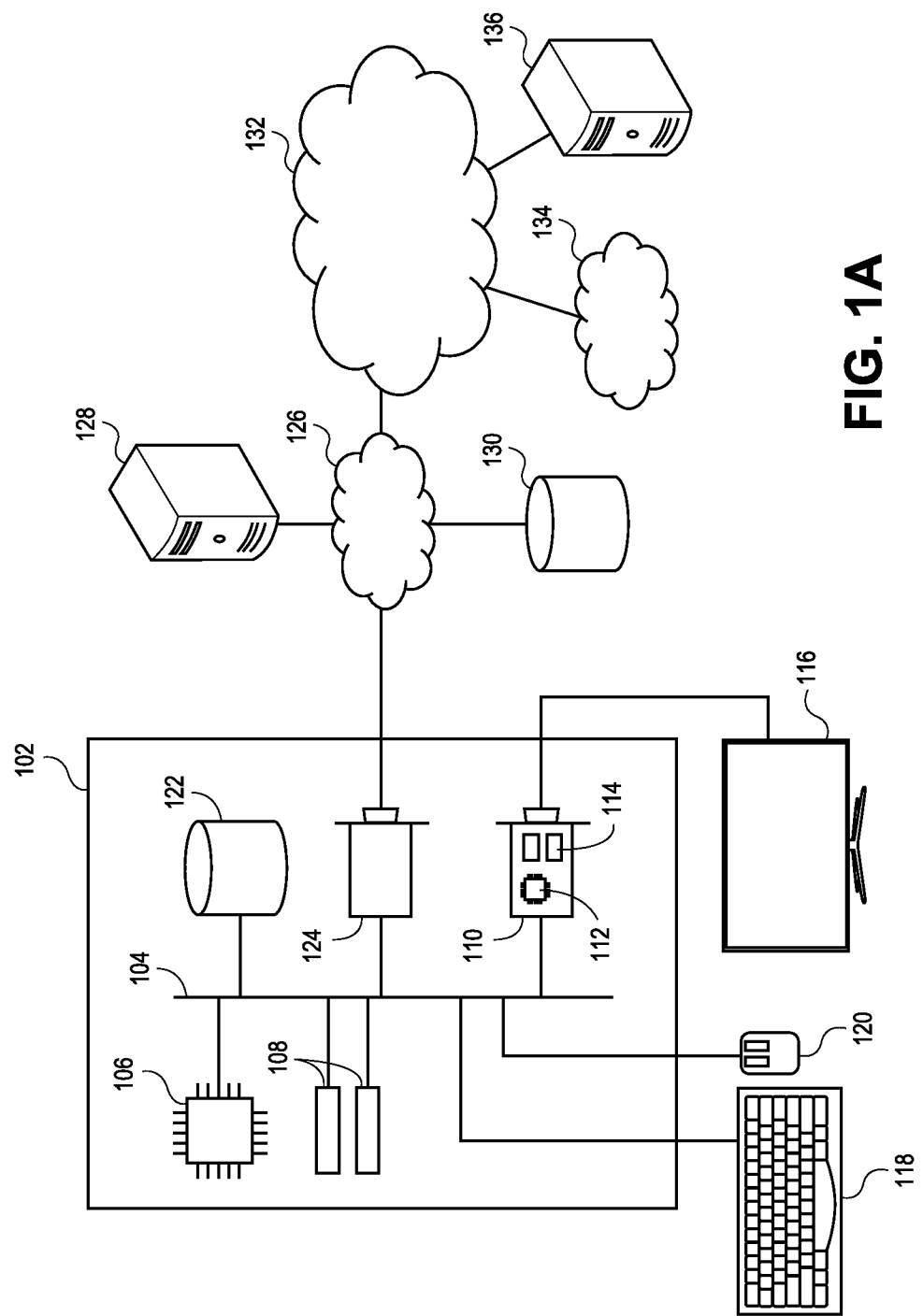
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

It should be understood that, in some embodiments, any of the components described with respect to FIG. 1A may be included in a mobile device. For example, in some embodiments, computer 102 and its contents are comprised within a mobile phone. Similarly, embodiments are contemplated where each of display 116, keyboard 118, and mouse 120 are replaced with a touch screen of a mobile device.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system 150 further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communication system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. In some embodiments, each user of the plurality of users may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within one of the channels have access to messages and files posted within that channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the operations described herein with respect to a processor may be carried out by the processors within any of the devices described herein. For example, in some embodiments, a processor within the group-based communication system server 158 may perform a first operation, while a processor within the client device performs a second operation.

Figure 2A:
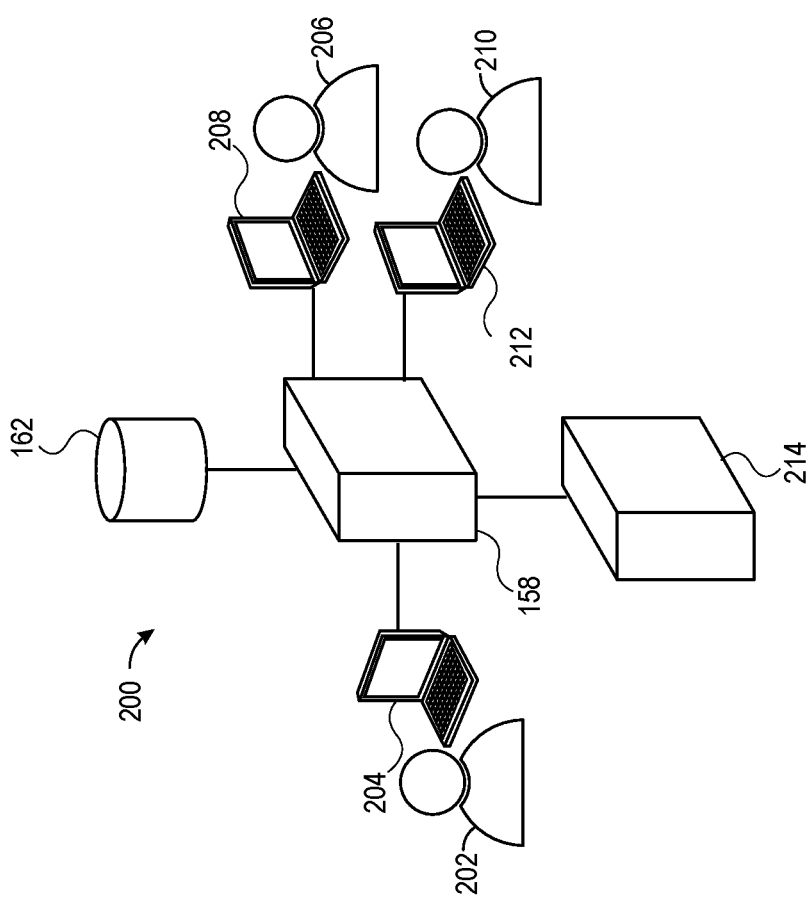
FIG. 2A depicts a data loss prevention system for carrying out embodiments of the invention.

Turning now to FIG. 2A, a system 200 for carrying out embodiments of the invention is depicted. In some embodiments, the system 200 includes a first user 202 operating a first user device 204. It should be understood that the first user device 204 may be any computing device described herein. For example, first user device 204 may be a desktop computer, a laptop computer, a mobile phone, or a tablet, as well as another suitable type of computing device operable to access an instance of the group-based communication system. In some embodiments, the system 200 also comprises the group-based communication system server 158 and the group-based communication system data store 162. Here, the group-based communication system server 158 may be in communication with the first user device 204, for example through a network, such as network 160. In some embodiments, a second user 206 operates a second user device 208, and a third user 210 operates a third user device 212. Similar to the first user device 204, each of the second user device 208 and the third user device 212 may be any suitable computing device described herein. In some such embodiments, the group-based communication system server 158 transmits and receives messages and other data from each of the user devices 204, 208, and 212.

In some embodiments, the system 200 further comprises a data loss prevention (DLP) engine 214. It should be understood that the DLP engine 214 in some embodiments, may be hosted by the group-based communication system, while in other embodiments, the DLP engine 214 may be hosted by an external third party application. In some embodiments, the DLP engine 214 is in communication with the group-based communication system server 158, as shown. Accordingly, the DLP engine 214 may monitor messages and other data received from the group-based communication system server 158. In some embodiments, the DLP engine 214 applies a DLP policy to scan and filter messages and other data within the group-based communication system. It should be understood that the DLP policy may be applied to various types of data on the group-based communication system, such as, for example, messages, comments, reactions, documents, images, videos, sounds, and other files.

In some embodiments, the DLP policy is used to remove messages and other data that comprise sensitive or otherwise offensive information. In such embodiments, it may be desirable to remove such types of information to prevent leakage of sensitive information and to avoid offensive information being conveyed, especially in a business environment. In some embodiments, the DLP engine 214 employs the DLP policy to review content posted and saved within the group-based communication system. Accordingly, the DLP engine 214 is able to identify and remove sensitive and offensive language from the group-based communication system. In some such embodiments, the DLP policy uses a set of DLP parameters to determine what content should be flagged or removed.

As used herein, sensitive information may include any of personally identifiable information, account numbers, social security numbers, credit card information, trade secrets, confidential business information, as well as other sensitive information that should not be shared on the group-based communication system. As used herein, offensive information may include any of profanity, harmful speech, threats, obscene images, or other offensive information that should not be shared on the group-based communication system. Accordingly, in some embodiments, the DLP engine 214 may include a profanity filter to identify and remove profane language from the group-based communication system.

In some embodiments, the DLP policy of the DLP engine 214 may be configurable by a user. For example, an administrative user may have access to set parameters of the DLP policy to determine what specific types of information should be considered either sensitive or offensive. In one example, an administrator of an organization may configure the DLP policy to identify and remove information that relates to certain business secrets by registering keywords associated with the business secrets into the DLP policy. Accordingly, the DLP policy may identify content that comprises the keywords using a text search function. In some embodiments, keywords may be searched and identified from within images using optical character recognition (OCR).

In some embodiments, the DLP engine 214 comprises at least one processor. Here, the DLP engine 214 may scan content from the group-based communication system to determine whether the content should be flagged or removed. In some embodiments, the processor of the DLP engine 214 may use the DLP policy to rank content with a DLP score. Accordingly, a DLP score may be assigned to each portion of content from the group-based communication system and if the DLP score exceeds a certain predetermined threshold value, then action may be taken to remove or flag the content. In some embodiments, multiple threshold values may be used such that content that exceeds a first threshold is flagged for review but not removed, while content that exceeds a second higher threshold is removed. In some embodiments, content that is flagged may be submitted to an administrative user for review.

In some embodiments, the DLP engine 214 may utilize a machine learning algorithm to train and improve the DLP parameters of the DLP policy. In such embodiments, the machine learning algorithm may be desirable to improve the accuracy of the DLP engine in determining what content should be removed. In some such embodiments, the machine learning algorithm will use the results from flagged content after the content is reviewed by the administrative user, as described above, to determine the accuracy of the algorithm. Here, the machine learning algorithm may falsely identify content as sensitive or offensive and flag the content, but after the administrative user reviews and accepts the content the machine learning algorithm is retrained such that similar content will not be flagged in the future. Accordingly, in some embodiments, it may be desirable to reduce the occurrence of false positives within the DLP engine 214 such that only content that is sensitive or offensive is removed. This may be desirable to alleviate the burden on the administrative user of reviewing falsely flagged content.

Figure 2B:
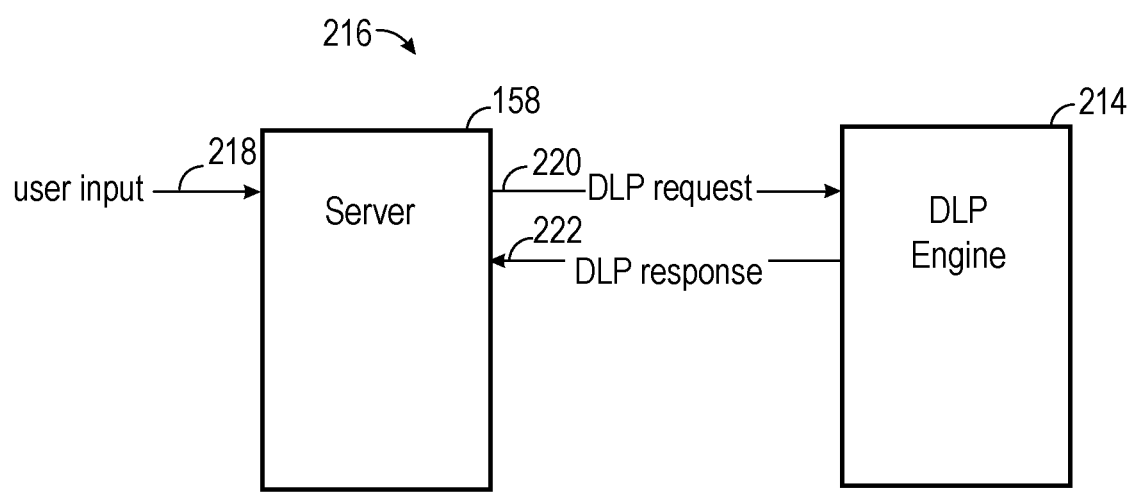
FIG. 2B depicts an exemplary diagram illustrating a communication system for carrying out embodiments of the invention.

Turning now to FIG. 2B, an exemplary diagram is depicted illustrating a communication system 216 relating to some embodiments of the invention. The communication system 216 provides communication between the group-based communication system server 158 and the DLP engine 214. A user input 218 may be received by the group-based communication system server 158, as shown. In some embodiments, the user input 218 may comprise a message, a file, or a reaction. The group-based communication system server 158 transmits a DLP request 220 to the DLP engine 214 including information indicative of the user input 218.

Upon receiving the DLP request 220, the DLP engine 214 processes the information indicative of the user input 218 and determines whether the user input 218 should be allowed or inhibited for display within the group-based communication system based on the DLP policy. In some embodiments, the DLP engine 214 transmits a DLP response 222 back to the group-based communication system server 158 indicating whether the user input 218 should be displayed. In other embodiments, the user input 218 is initially displayed in the channel and subsequently removed if the DLP response 222 indicates that user input 218 violates a CLP policy.

It should be understood that communication between the group-based communication system server 158 and the DLP engine 214 may be carried out over a network such as, for example network 160, as shown in FIG. 1B. Alternatively, in some embodiments, the DLP engine 214 may be hosted on the group-based communication system server 158 such that the communication may be carried out natively.

Figure 3:
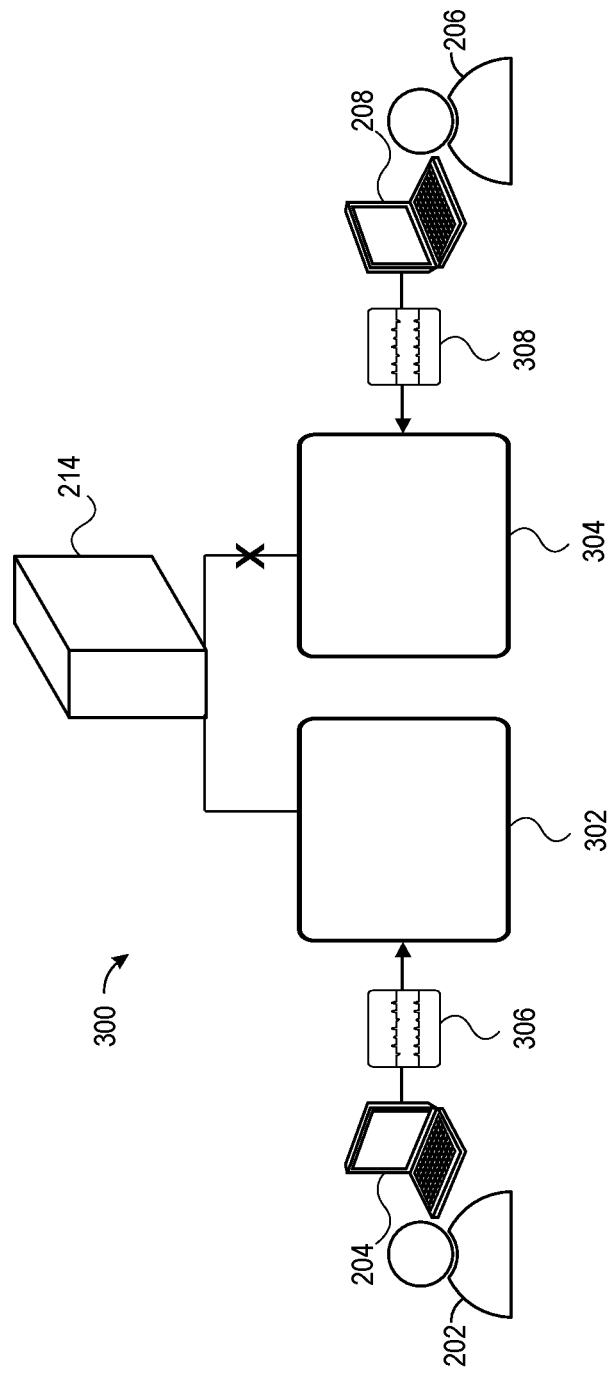
FIG. 3 depicts a contextual DLP system for some embodiments of the invention.

Turning now to FIG. 3, a contextual DLP system 300 is depicted relating to some embodiments of the invention. Here, the contextual DLP system 300 may include a first group-based communication channel 302 and a second group-based communication channel 304 hosted on the group-based communication system. In some embodiments, the first user 202 may operate the first user device 204 to transmit a first user input 306 to be displayed in the first channel 302. The first user input 306 may comprise any of a message, a file upload, or other type of content. The DLP engine 214 may apply the DLP policy to the first user input 306 and based on the application of the DLP policy, inhibit display of the first user input 306 in the first channel 302. Here, if the first user input 306 violates the DLP policy the first user input 306 is inhibited from being displayed within the first channel 302, for example, by removing or flagging the first user input 306. Alternatively, if the first user input 306 does not violate the DLP policy, the first user input 306 may be allowed and displayed in the first channel 302. In some embodiments, determining whether a user input violates the DLP policy may be based on a DLP score, as discussed above. In some embodiments, additional outcomes may be provided. For example, instead of completely removing the first user input 306, the first user input 306 may be flagged for administrative review.

In some situations, users may have a need to temporarily escape the constraints of a DLP policy. For example, a user may need to escape a DLP policy that prevents displaying personally identifiable information in order to complete human resources paperwork for a new hire. Accordingly, vault channels may be provided to share sensitive information securely between a limited set of users (e.g., employees in the human resources team). In some embodiments, the second channel 304 is a vault channel where the DLP policy may be suspended. The vault channel 304 is created when the DLP policy is triggered. Instead, the blocked information or message is displayed in vault channel 304 instead of the channel where the message was originally sent. In some examples, the DLP policy does not apply to vault channel 304. In some examples, when the DLP policy is triggered, the first user is prompted to create a vaulted channel such as vault channel 304 where the sensitive information may be screened. In some examples, the creation of the vaulted channel is automatic and created in response to the DLP policy being triggered.

If the second user 206 or another user transmits a second user input 308 to the second vault channel 304 the application of the DLP policy may be suspended based on the context of the second channel 304 such that the second user input 308 is displayed within the second channel 304. In some such embodiments, the message or channel may then be deleted after a predetermined period of time (such as, for example, 30 seconds, 60 seconds, 90 seconds two minutes, or five minutes). Similar to the first user input 306 the second user input 308 may comprise a message, a file upload, or another type of data. In some embodiments, the second user input 308 may be received from the second user 206, as shown. While two users and two user inputs are shown, both inputs may be received form the same user and may be the same input, which is suspended or permitted depending on the context of the channel (for example, whether the channel is a vault channel). Alternatively, in some embodiments, both the first user input 306 and the second user input 308 may be received from the first user 202.

It should be understood that, in some embodiments, suspension of the DLP policy may be applied in a variety of ways. For example, in some embodiments, the DLP policy may be completely suspended such that the DLP policy does not block content from being displayed within the second channel 304. Alternatively, in some embodiments, only certain aspects of the DLP policy may be suspended. For example, a user may configure the settings of the second channel 304 such that a DLP parameter of the DLP policy for removing content comprising tax file numbers is suspended while other DLP parameters of the DLP policy remain. Accordingly, users may freely share tax file numbers in the second channel 304 while other sensitive content is removed by the DLP engine 214.

Figure 4:
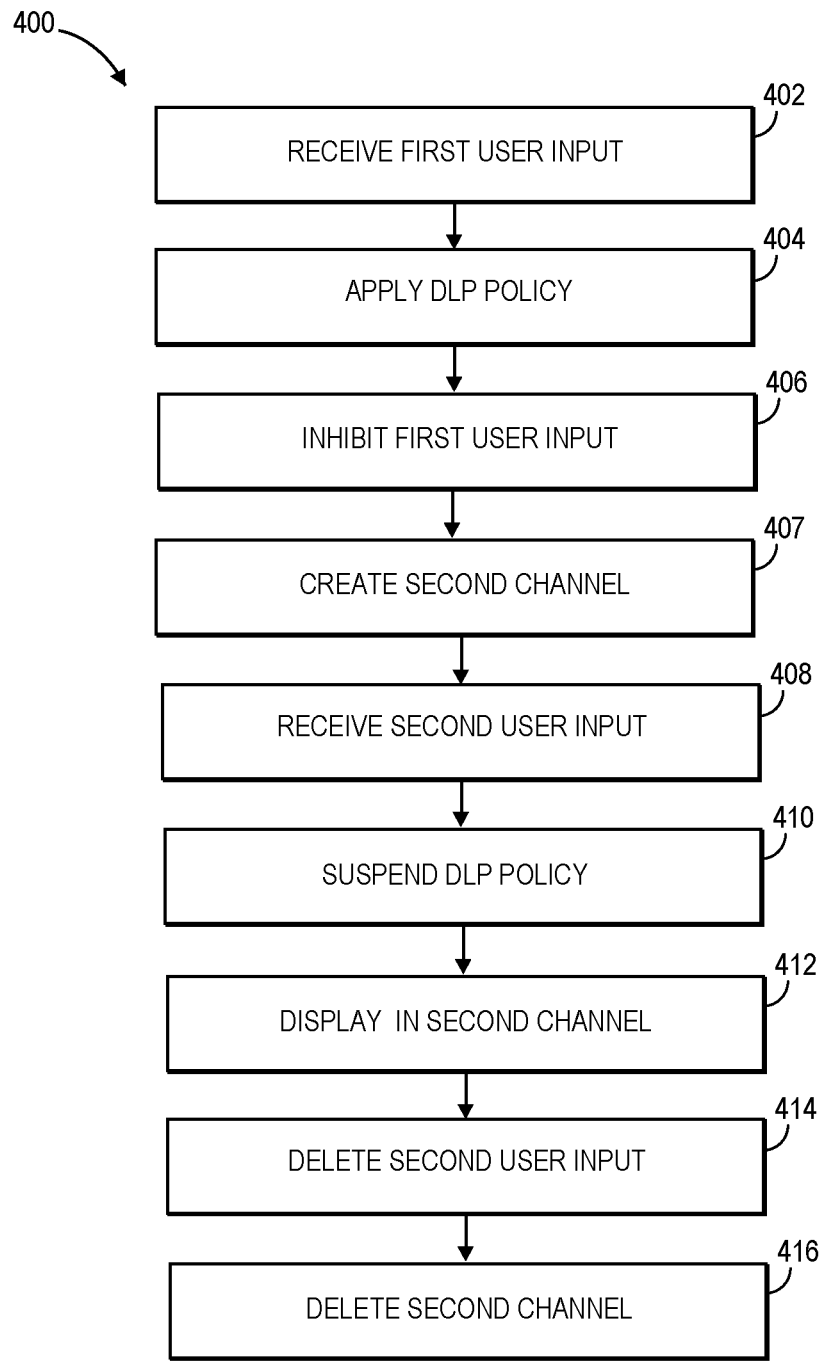
FIG. 4 depicts a method for performing DLP for some embodiments of the invention.

Turning now to FIG. 4, a method 400 for performing DLP is depicted relating to some embodiments of the invention. It should be understood that the steps described herein may be carried out on at least one processor such as a processor of the group-based communication system server 158 or a processor of one of user devices 204, 208, or 212. Further, in some embodiments, a first portion of the steps may be carried out on a first processor while a second portion of steps are carried out on a second processor. At step 402, the first user input 306 is received. In some embodiments, the first user input 306 may be received from the first user 202 operating the first user device 204. However, it should be understood that the first user input 306 may be received from any user of the group-based communication system.

At step 404, the DLP policy is applied to the first user input 306 using the DLP engine 214. In some embodiments, the DLP policy is applied based on the context of the first channel 302. The DLP policy may be applied to determine whether the contents of the first user input 306 violates any of the DLP parameters. At step 406, in response to determining that the first user input 306 violates the DLP policy, the first user input 306 is prevented from being displayed within the first channel 302 (or initially displayed and subsequently removed if the input violated the DLP policy). In some embodiments, the first user input 306 is not displayed in the first channel 302 entirely, while in other embodiments, a notification that content has been removed may be displayed in the first channel 302 in place of the first user input 306.

At step 407, a second channel is created within the group-based communication system. In some embodiments, the second channel is a vault channel for which at least a portion of the DLP policy is suspended. In some embodiments, the second channel is created prior to displaying a second user input such that the second user input may be displayed in a communications environment free of hindrance from the DLP engine 214. At step 408, a second user input 308 is received. Similar to the first user input 306, the second user input 308 may be received from any user of the group-based communication system. In some embodiments, the second user input 308 may be received from the same user who submitted the first user input 306, while in other embodiments, each input is received from a different user. At step 410, the DLP policy of the DLP engine 214 is suspended based at least in part on the context of the second channel 304. For example, the second channel may be a limited-duration vault channel with the application of DLP suspended.

In some embodiments, the DLP policy is completely suspended within the second channel 304 such that no content is blocked within the second channel 304. Alternatively, in some embodiments, the DLP policy may still be partially applied. For example, the DLP policy may be applied such that certain content is still blocked or removed while other content that is usually removed is kept based on the context of the channel. In some embodiments, it may be desirable that the DLP policy remain active within the second channel 304 for offensive content but be suspended for sensitive data within the second channel 304. In some such embodiments, only certain DLP parameters of the DLP policy are suspended, as described above.

At step 412, the second user input 308 is displayed within the second channel 304. In some embodiments, the second user input 308 may be displayed temporarily. For example, the second user input 308 may be displayed only for a predetermined amount of time, such as, for example, 30 seconds, 1 minute, 2 minutes, 10 minutes, or another suitable amount of time. At step 414, the second user input 308 is deleted from the second channel 304. In some embodiments, the second user input 308 is deleted after expiration of the predetermined period of time. It may be desirable to delete the second user input 308 after the predetermined amount of time to prevent leaking of sensitive information. Accordingly, a means by which sensitive information can be safely and effectively shared is contemplated.

In some embodiments, at step 416, the second channel 304 is deleted. In such embodiments, the second channel 304 may be deleted after expiration of the predetermined period of time. In some embodiments, the second channel 304 is deleted at the same time as the second user input 308. Alternatively, in some embodiments, the second channel 304 may be deleted after the expiration of a separate longer predetermined period of time such that the second channel 304 survives after the second user input 308 has been deleted.

In some embodiments, it may be desirable to suspend application of the DLP policy such that certain types of sensitive content can be shared without being blocked or removed. For example, if a channel is created between an accountant and an employee where the employee is expected to share their social security number for tax purposes, the content should not be blocked. Here, the second channel 304 may be used such that the DLP policy is suspended, at least temporarily so the information can be shared. Accordingly, the second channel 304 may be a vault channel for sharing sensitive information in a safe manner.

In some embodiments, the predetermined period of time may be configurable by a user. For example, when creating the second channel 304, the channel creator may define the predetermined period of time. Alternatively, in some embodiments, users may define a predetermined period of time for each message when sending messages within the second channel 304. Further, in some embodiments, users may be prompted to create a vault channel when sending a message, file, or other content within the group-based communication system or after content is blocked by the DLP policy. For example, if a user sends a message that is blocked in the first channel by the DLP policy because the contents of the message comprised a social security number, then the user may be prompted to create the second channel 304 to safely send the message containing sensitive information such as the user's social security number.

Figure 5:
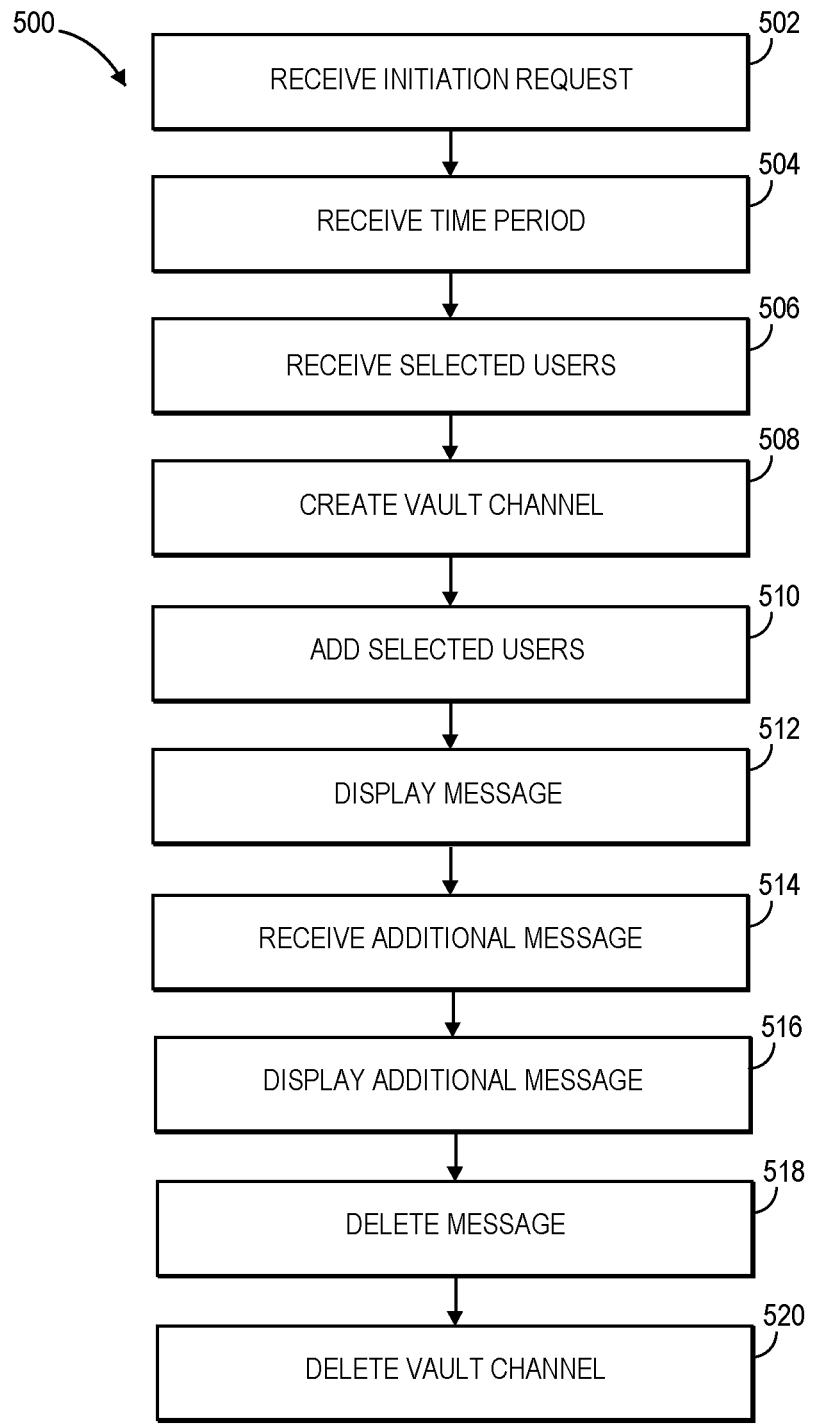
FIG. 5 depicts a method for creating and operating a vault channel for some embodiments of the invention.

Turning now to FIG. 5, a method 500 for creating and operating a vault channel is depicted relating to some embodiments of the invention. At step 502, a vault channel initiation request is received from a user. The vault channel initiation request may be received in response to a user accepting a prompt to create a vault channel or a user selecting a vault creation shortcut. In some embodiments, only certain users have access to create vault channels and be added to vault channels. For example, in some embodiments, only administrative users or users with a specific authorization are allowed to create vault channels. At step 504, a predetermined period of time for the vault channel is received from the user. The predetermined period of time may determine the lifetime of messages within the vault channel as well as the lifetime of the vault channel itself. In some embodiments, a plurality of periods of time may be received at step 504, with a first period of time relating to the lifetime of a message and a second period of time relating to the lifetime of the vault channel. In some embodiments, a predetermined time may instead be used. Further, in some embodiments, the lifetime of the vault channel may be a predetermined period of time after the lifetime of the message.

At step 506, a set of selected users to be added to the vault channel is received from the user. As discussed above, in some embodiments, only certain users are allowed to be added to vault channels, such that the user may only be allowed to select users that are associated with this authorization. Alternatively, in some embodiments, any user may be allowed to be added to a vault channel. Further, in some embodiments, only users who belong to the same organization are allowed to be added to the vault channel.

At step 508, the vault channel is created within the group-based communication system and the selected users are added to the vault channel at step 510. After the vault channel has been created, the message is displayed within the vault channel at step 512 such that the selected users may view the contents of the message. It should be understood that embodiments of the invention are not limited to simple text messages within the vault channel. For example, in some embodiments, the messages may comprise file attachments, images, or other types of data. Further, in some embodiments, the message may not contain any text at all and is only a file.

At step 514, at least one additional message is received for display in the vault channel. Here, the additional messages may be received from one or more of the selected users or from the user who created the vault channel. For example, one of the selected users may wish to respond to the initial message posted by the user who created the vault. Alternatively, the user who created the vault may wish to correct the initial message, for example if the initial message contained a typographical error. At step 516, the additional messages are displayed within the vault channel such that all selected users and the user who created the vault can view the messages.

At step 518, the message is deleted from the vault channel. In some embodiments, the message is deleted after the predetermined period of time specified at step 504 has expired. Further, in some embodiments, all additional messages received at step 514 are also deleted along with the initial message. Alternatively, in some embodiments, each message survives for the predetermined period of time after the respective message was received. For example, each message may be deleted 1 minute after the message was received or displayed in the vault channel. Furthermore, embodiments are contemplated where all messages are deleted after the predetermined amount of time has passed from when the vault channel was created. At step 520, the vault channel is deleted. In some embodiments, the vault channel is deleted at the same time as the message. Alternatively, in some embodiments, the vault channel may be deleted at a separate predetermined time or after a predetermined time has passed from when the message was deleted. For example, in some embodiments, the vault channel may be deleted 10 seconds after the last remaining message has been deleted.

Figure 6A:
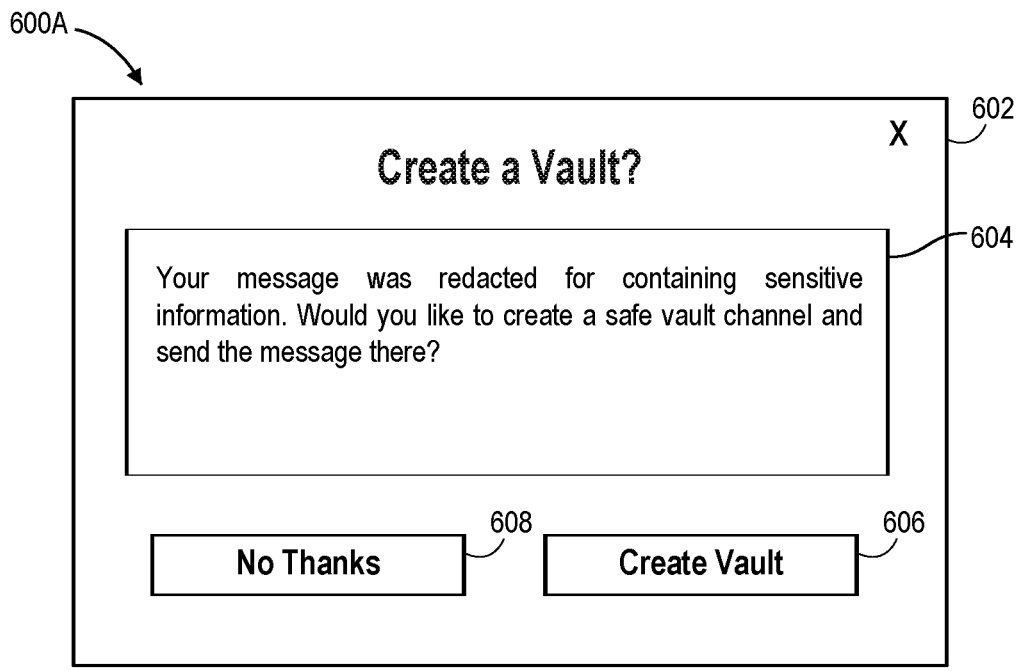
FIG. 6A depicts an exemplary screenshot illustrating a prompt to create a vault channel for some embodiments of the invention.
Figure 6B:
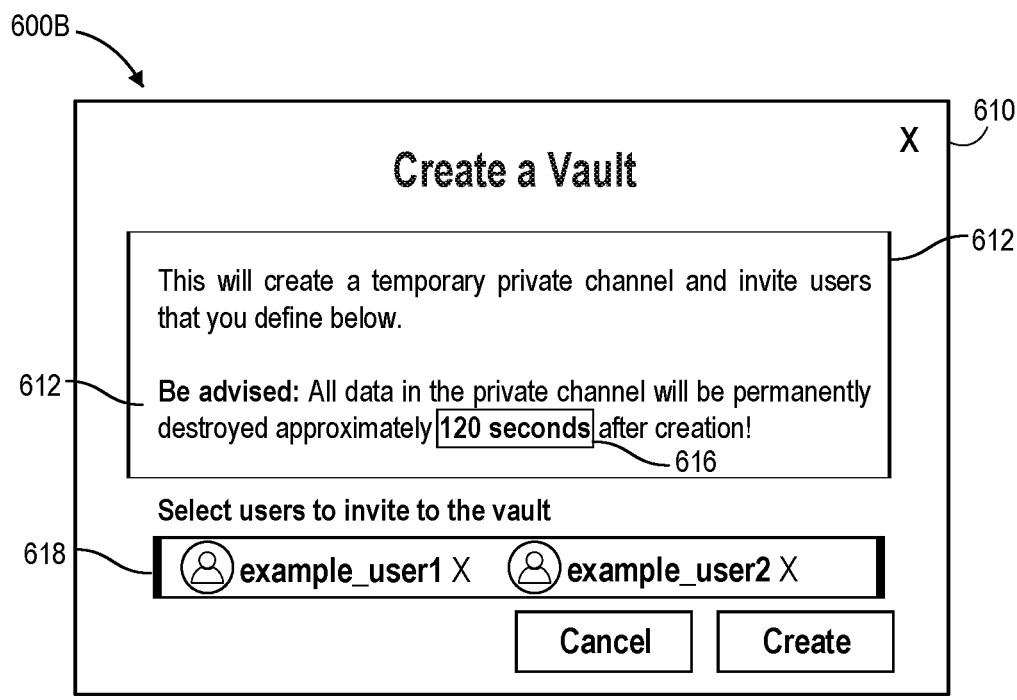
FIG. 6B depicts an exemplary screenshot illustrating a vault channel configuration user interface for some embodiments of the invention.

Turning now to FIG. 6A, an exemplary screenshot 600A illustrating a prompt 602 to create a vault channel is depicted relating to some embodiments of the invention. The prompt 602 comprises a text description 604 with a message for the user and a create vault button 606 for initiating the creation of a vault channel. In some embodiments, the text description 604 comprises text notifying the user that the previous message was not sent due to the message containing sensitive information, as well as a text asking if the user would like to create a vault channel to resend the message, as shown. If the user clicks the create vault button 606 a vault channel configuration user interface 610 may be displayed to the user such as shown in FIG. 6B. In some embodiments, upon creation of the vault channel the message may be automatically transferred to the vault channel and displayed. Alternatively, the user may select a decline button 608 to decline the prompt 602 such that the vault channel is not created and the original message is removed from the group-based communication system.

Turning now to FIG. 6B, an exemplary screenshot 600B illustrating a vault channel configuration user interface 610 for configuring vault settings for a vault channel is depicted relating to some embodiments of the invention. In some embodiments, the vault channel configuration user interface 610 may comprise a text description 612 describing the vault channel and a warning message 614 about the vault channel. In some such embodiments, the text description 612 may notify the user that the vault channel is a temporary private channel for selected users and the warning message 614 may notify the user that the contents of the vault channel will be deleted after expiration of a predetermined period of time, as shown. It should be understood that the notifications may include different information depending on the specific applications of the invention. Additionally, in some embodiments, the interface 610 further comprises a time input field 616 for the user to specify at least one predetermined period of time and a user selection input field 618 for the user to specify additional users to be added to the vault channel when the vault channel is created. In some embodiments, the time input field 616 allows the user to define and adjust the predetermined period of time.

Figure 6C:
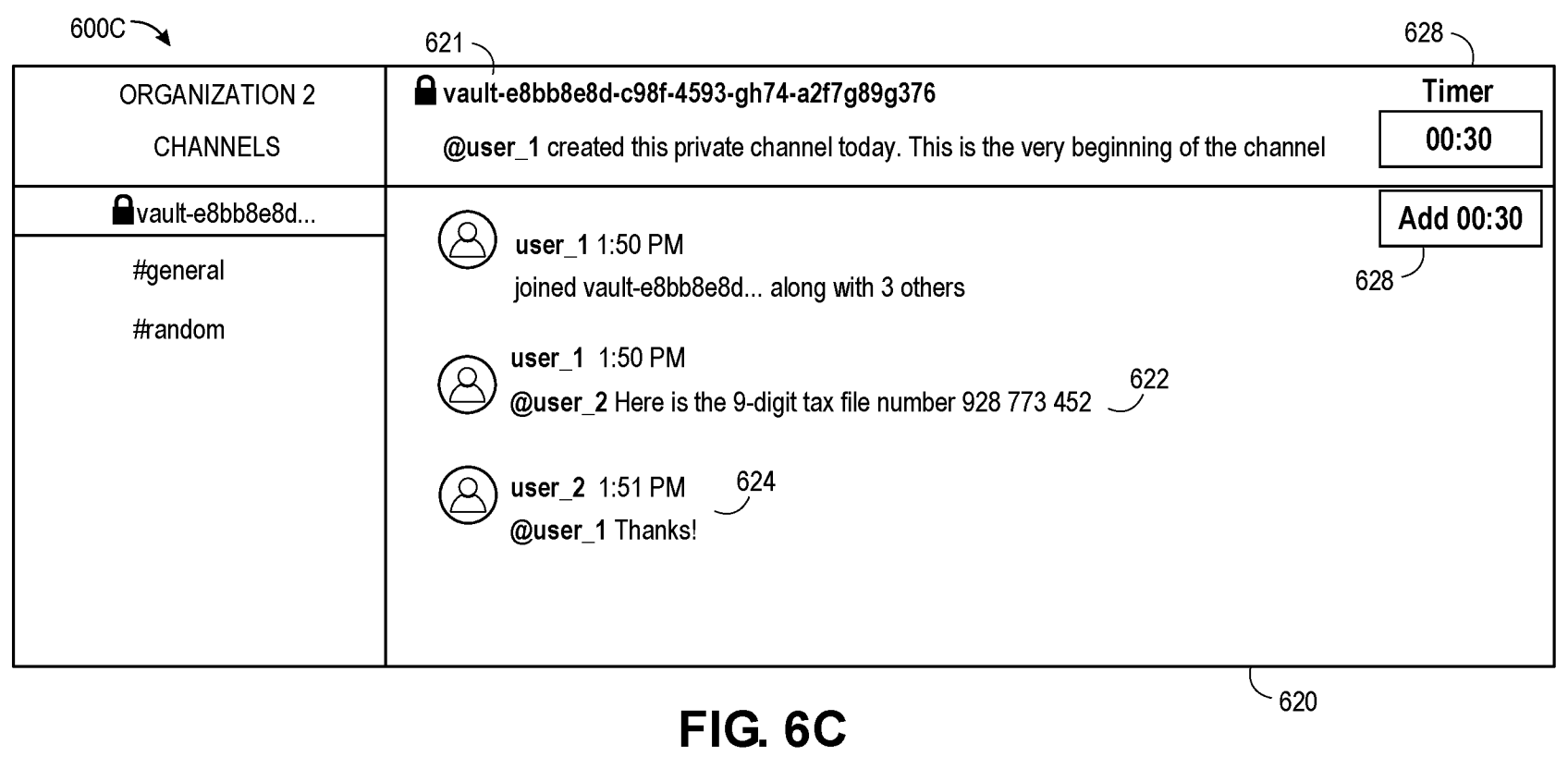

Turning now to FIG. 6C an exemplary screenshot 600C illustrating a vault channel user interface 620 displaying a vault channel is depicted relating to some embodiments of the invention. The user interface 620 displays an initial message 622 posted within the vault channel, as well as a subsequent message 624. In some embodiments, the user interface 620 also includes a timer 626 indicating the time remaining for the vault channel, as shown. Additionally, in some embodiments, a time extension button 628 may optionally be included. The time extension button 628 may be selected by a user to extend the lifetime of the vault channel by a predetermined period of time. For example, if there are 30 seconds remaining before the vault channel is deleted, a user may select the time extension button 628 to add 30 additional seconds such that the vault channel will last for 1 minute. In some embodiments, an extension request is submitted to the group-based communication system server 158 or a processor whenever the user selects the time extension button 628. In response to receiving the extension request, the predetermined period of time is increased and the lifetime of the user input is extended.

In some embodiments, a vault ID 621 is displayed on the user interface 620 identifying the vault. Here, it may be desirable to include the vault ID 621 instead of a name for the vault to maintain the temporary and secret nature of the vault channel. Alternatively, in some embodiments, the vault channel may have a channel name which may be configured by a user when creating the vault channel.

In some embodiments, the time extension button 628 may be desirable such that users have the ability to prolong the lifetime of the vault channel. An exemplary scenario is contemplated where a user wishes to share a password with another user via the vault. However, the other user is away from their computer and does not immediately receive a message including the password posted in the vault channel. Accordingly, the user may select the time extension button 628 to extend the duration of time before the vault channel and message are deleted such that the other user has time to record the password.

In some embodiments, certain operations may be restricted within the vault channel. For example, in some embodiments, screen captures may be prevented within the vault channel such that sensitive information cannot be captured and stored. In some embodiments, if a user attempts to take a screenshot from within the vault channel, a notification may be displayed stating that screenshots are currently disabled. Similarly, other capture operations such as selecting or copying text, video screen recording, and/or audio recording may also be disabled within the vault channel.

In some embodiments, it may be desirable to include an additional feature to convert a vault channel into a regular channel. For example, a user may decide that the information shared within the vault would be helpful and should not be deleted. Accordingly, the user may request that the vault channel be converted into a standard or private channel. It should be understood that such a feature may lead to security concerns in some embodiments. Accordingly, DLP may be implemented whenever the channel is converted or, in some embodiments, authorization may be required before converting a vault channel. Additionally, in some embodiments, authorization may be required from each user of the vault channel or from each user who has shared content within the vault channel. Such authorization may comprise acceptance of a prompt from each user. For example, a prompt may be displayed on each user's device requesting that the content of the vault channel be made available in a standard or private channel. However, it should be understood that such a conversion feature may not be included in some embodiments, to maintain the security of the vault channel.

Figure 7:
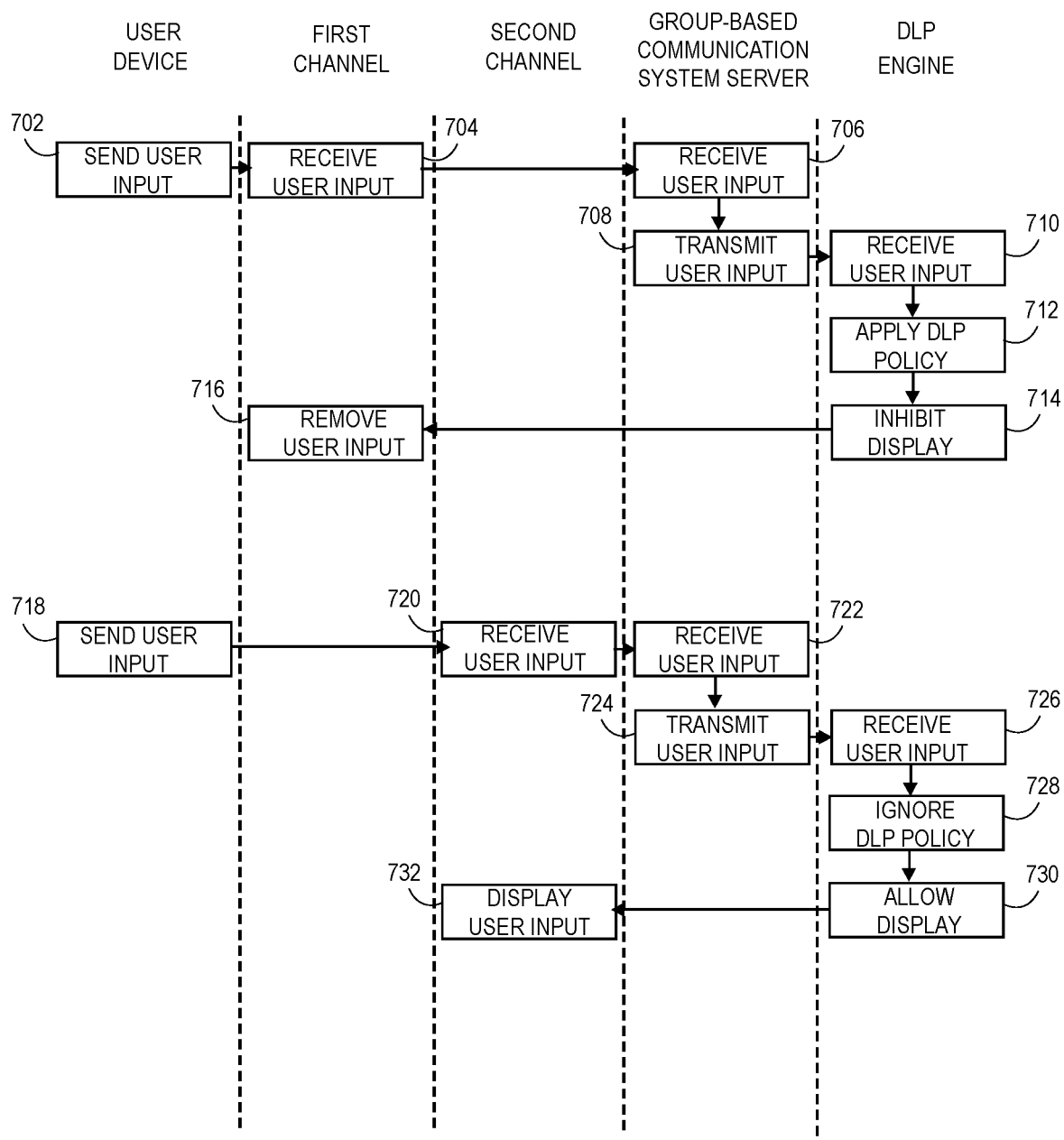
FIG. 7 depicts a swim lane diagram illustrating the component responsibility flow for performing contextual DLP for some embodiments of the invention.

Turning now to FIG. 7, a swim lane diagram illustrating the component responsibility flow for performing contextual DLP relating to some embodiments is depicted and referred to generally by reference numeral 700. At step 702, a user input is sent from a user device to be displayed in the first channel 302. It should be understood that, in some embodiments, the user device may be any of the first user device 204, the second user device 208, or one of the client devices 152, 154, or 156. In some embodiments, the user input comprises at least one of a message, a file, or a reaction.

At step 704, the user input is received by the first channel 302. In some embodiments, the first channel 302 may be a standard public or private channel of the group-based communication system. At step 706, the user input is received by the group-based communication system server 158 and, at step 708, the group-based communication system server 158 transmits the user input to the DLP engine 214. Upon receiving the user input, the DLP engine 214 applies the DLP policy to the received user input based at least in part on the context of the first channel 302. It should be understood that the DLP engine 214 may use the DLP policy to determine whether the user input should be inhibited or allowed within (or, if already displayed, removed from) the designated channel. Accordingly, in some embodiments, the DLP engine 214 may also receive an indication of what channel the user input is intended to be displayed in.

Based on the applied DLP policy the DLP engine 214 may inhibit display of the user input for the first channel 302 at step 714. Accordingly, at step 716, the user input is removed from the first channel 302 such that the user input is not displayed. Alternatively, the user input may be flagged for review or temporarily suspended within the first channel 302. In some embodiments, the user input may be displayed while the user input is simultaneously processed by the DLP engine 214 and then retroactively removed based on the DLP policy. Alternatively, in some embodiments the user input is not displayed in the first channel 302 until display has been allowed by the DLP engine 214.

It should be understood that in some embodiments, the DLP engine 214 may determine that the user input satisfies the DLP policy at step 712. Accordingly, in this case, the user input is allowed to be displayed at step 716. At step 718, a second user input is sent from a user device intended to be displayed in the second channel 304. It should be understood that the second user input may be composed by the same user who sent the previous user input or from another user. Additionally, the second user input may be sent from the same user device or another user device. At step 720, the second user input is received in the second channel 304. At step 722, the second user input is received by the group-based communication system server 158 and transmitted to the DLP engine 214 at step 724.

At step 726, the second user input is received by the DLP engine 214. At step 728, the DLP engine 214 ignores at least a portion of the DLP policy based at least in part on the context of the second channel 304. For example, in some embodiments, the second channel is a vault channel for which DLP policy is suspended, such that the DLP policy is ignored for user inputs intended for display in the second channel. At step 730, the DLP engine 214 allows display of the second user input within the second channel 304. Accordingly, the second user input is displayed in the second channel 304 at step 732.

As discussed above, in some embodiments, only certain DLP parameters of the DLP policy may be suspended within the second channel 304. In some such embodiments, the specific DLP parameters that are suspended are configured by a user when setting up the vault channel, for example, using the vault channel configuration user interface 610. For example, a user may select a DLP parameter for removing content comprising social security numbers to be suspended in the second channel 304, such that social security numbers can be shared in the second channel 304 at least for the predetermined period of time. Additionally, in some embodiments, a user may configure a predetermined period of time for various types of sensitive content. For example, a user may set content comprising social security numbers to be removed after 2 minutes but content comprising an email address to be removed after 15 minutes.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method of data loss prevention (DLP) within a group-based communication system, the method comprising:
   receiving a first user input in a first channel of the group-based communication systems wherein the first channel of the group-based communication system is accessible to a first plurality of users;
   applying, through a DLP engine, a DLP policy to the first user input;
   based on applying the DLP policy, if the first user input violates the DLP policy, inhibiting display of the first user input in the first channel of the group-based communication system;
   in response to the first user input violating the DLP policy, creating a second channel of the group-based communication system, wherein the second channel of the group-based communication system is accessible to a second plurality of users comprising a subset of the first plurality of users;
   wherein the second channel is a vault channel for sharing sensitive information in a safe manner;
   receiving a second user input in the second channel of the group-based communication system; and
   in response to applying the DLP policy, displaying the second user input in the second channel.

2. The one or more non-transitory computer-readable media of claim 1, wherein at least one of the first user input or the second user input is a file upload.

3. The one or more non-transitory computer-readable media of claim 1, wherein the second user input is displayed for a predetermined period of time, and after expiration of the predetermined period of time, the second user input is deleted from the second channel.

4. The one or more non-transitory computer-readable media of claim 3, wherein the predetermined period of time is configurable by a user.

5. The one or more non-transitory computer-readable media of claim 4, wherein the method further comprises deleting the second channel from the group-based communication system after expiration of an additional predetermined period of time.

6. The one or more non-transitory computer-readable media of claim 1, further comprising:
   based at least in part on contents of the first user input, displaying a prompt to transfer the contents of the first user input to the second channel.

7. The one or more non-transitory computer-readable media of claim 1, further comprising:
   preventing a capture operation based at least in part on a context for the second channel.

8. A method of data loss prevention (DLP) within a group-based communication system, the method comprising:
   receiving a first user input in a first channel of the group-based communication systems wherein the first channel of the group-based communication system is accessible to a first plurality of users;
   applying, through a DLP engine, a DLP policy to the first user input;
   based on applying the DLP policy, if the first user input violates the DLP policy, inhibiting display of the first user input in the first channel of the group-based communication system;
   in response to the first user input violating the DLP policy, creating a second channel of the group-based communication system, wherein the second channel of the group-based communication system is accessible to a second plurality of users comprising a subset of the first plurality of users;
   wherein the second channel is a vault channel for sharing sensitive information in a safe manner;
   receiving a second user input in the second channel of the group-based communication system; and
   in response to applying the DLP policy, displaying the second user input in the second channel.

9. The method of claim 8, wherein at least one of the first user input or the second user input is a file upload.

10. The method of claim 8, wherein the second user input is displayed for a predetermined period of time, and after expiration of the predetermined period of time, the second user input is deleted from the second channel.

11. The method of claim 10, wherein the predetermined period of time is configurable by a user.

12. The method of claim 10, wherein the method further comprises deleting the second channel from the group-based communication system after expiration of an additional predetermined period of time.

13. The method of claim 8, further comprising:
   based at least in part on contents of the first user input, displaying a prompt to transfer the contents of the first user input to the second channel.

14. The method of claim 8, further comprising:
   preventing a capture operation based at least in part on a context for the second channel.

15. A data loss prevention system comprising:
   a data store; and
   a processor, programmed to perform a method of data loss prevention (DLP) within a group-based communication system, the method comprising:
   receiving a first user input in a first channel of the group-based communication system, wherein the first channel of the group-based communication system is accessible to a first plurality of users;
   applying, through a DLP engine, a DLP policy to the first user input;

based on applying the DLP policy, if the first user input violates the DLP policy, inhibiting display of the first user input in the first channel of the group-based communication system;

in response to the first user input violating the DLP policy, creating a second channel within of the group-based communication system, wherein the second channel of the group-based communication system is accessible to a second plurality of users comprising a subset of the first plurality of users;

wherein the second channel is a vault channel for sharing sensitive information in a safe manner;

receiving a second user input in the second channel of the group-based communication system; and in response to applying the DLP policy, displaying the second user input in the second channel.

16. The data loss prevention system of claim 15, wherein at least one of the first user input or the second user input is a file upload.

17. The data loss prevention system of claim 15, wherein the second user input is displayed for a predetermined period of time, and after expiration of the predetermined period of time, the second user input is deleted from the second channel.

18. The data loss prevention system of claim 17, wherein the predetermined period of time is configurable by a user.

19. The data loss prevention system of claim 17, wherein the method further comprises deleting the second channel from the group-based communication system after expiration of an additional predetermined period of time.

20. The data loss prevention system of claim 15, wherein the method further comprises:

based at least in part on contents of the first user input, displaying a prompt to transfer the contents of the first user input to the second channel.

* * * * *